(12) United States Patent
Wang

(10) Patent No.: US 10,824,270 B1
(45) Date of Patent: Nov. 3, 2020

(54) MULTI-MODE OPERATION METHOD FOR CAPACITIVE TOUCH PANEL

(71) Applicant: HYCON TECHNOLOGY CORP., Taipei (TW)

(72) Inventor: Yu-Jen Wang, Taipei (TW)

(73) Assignee: HYCON TECHNOLOGY CORP., Taipei (TW)

( * ) Notice: Subject to any disclaimer, the term of this patent is extended or adjusted under 35 U.S.C. 154(b) by 0 days.

(21) Appl. No.: 16/711,526

(22) Filed: Dec. 12, 2019

(51) Int. Cl.
*G06F 3/041* (2006.01)
*G06F 3/044* (2006.01)

(52) U.S. Cl.
CPC ........ *G06F 3/041662* (2019.05); *G06F 3/044* (2013.01); *G06F 3/0418* (2013.01)

(58) Field of Classification Search
CPC ... G06F 3/0418; G06F 3/044; G06F 3/041662
See application file for complete search history.

(56) References Cited

U.S. PATENT DOCUMENTS

| | | | | |
|---|---|---|---|---|
| 8,982,097 B1 * | 3/2015 | Kuzo | ................... | G06F 3/0418 345/174 |
| 10,126,877 B1 * | 11/2018 | Lynn | ................... | G06F 3/03547 |
| 2011/0241907 A1 * | 10/2011 | Cordeiro | ............... | G06F 3/0418 341/20 |
| 2014/0198064 A1 * | 7/2014 | Kim | ........................ | G06F 3/044 345/173 |
| 2016/0291796 A1 * | 10/2016 | Ho | ........................ | G06F 1/1656 |

* cited by examiner

*Primary Examiner* — Muhammad N Edun
(74) *Attorney, Agent, or Firm* — Demian K. Jackson; Jackson IPG PLLC

(57) ABSTRACT

A multi-mode operation method for a capacitive touch panel includes the steps of: using an initial mutual capacitance value of the panel as a reference value; obtaining a new mutual capacitance value as an original value after the initial step; comparing the original value with the reference value to obtain a detection value; comparing a current detection value with a previous detection value to obtain a first comparison result; when a touch cell has a detection value smaller than 0 if any of other touch cells in the vertical direction and the horizontal direction of the touch cell has a detection value greater than an effective touch standard value, obtaining a calculated value according to the detection value of the touch cell and an absolute value of the touch cell, as the detection value of the touch cell; and selecting between a normal mode and a waterproof mode as the operation mode according to the first comparison result and the detection values of all the touch cells.

22 Claims, 7 Drawing Sheets

Fig. 2A  detection values by finger touch

Fig. 2B  detection values with water

Fig. 5

MULTI-MODE OPERATION METHOD FOR CAPACITIVE TOUCH PANEL

FIELD OF THE INVENTION

The present invention relates to a multi-mode operation method for a capacitive touch panel. More specifically, the present invention relates to a waterproof operation method for a capacitive touch panel using a mutual capacitance scan.

BACKGROUND OF THE INVENTION

Capacitive touch panels have been widely used in various types of electronic or computing devices, especially electronic devices such as mobile phones, tablet computers, and notebook computers. Capacitive touch panels often face extremely different operation environments, such as water or highly conductive liquid spilled on a touchpad, contaminants, and the like. In order to solve this problem, U.S. Pat. No. 8,823,678 and Taiwan Patent No. 1490,764 disclose methods for judging locations of water contaminations, respectively. U.S. Pat. No. 8,823,678 determines the presence or absence of contaminants based on detected capacitance levels in the dry mode and the wet mode. Taiwan Patent No. 1490,764 utilizes self-capacitive scanning to compare scan signals of various rows to identify positions with water. However, these prior arts only identify regions affected by water but do not recognize whether these regions are effectively touched.

In addition, these prior arts cannot deal with a problem where a panel is contaminated by a highly conductive liquid such as salt water, thereby lowering accuracy of identifying touched points.

Therefore, there is a need for a capacitive touch panel technology that can reduce incorrect identifications and have high report rate in a variety of different modes.

SUMMARY OF THE INVENTION

This paragraph extracts and compiles some features of the present invention; other features will be disclosed in the follow-up paragraphs. It is intended to cover various modifications and similar arrangements included within the spirit and scope of the appended claims.

In order to provide a technology that can accurately judge various operation modes and have high report rates in various operation modes, the present invention discloses a multi-mode operation method for a capacitive touch panel having a plurality of touch cells for obtaining a detection value from each of the plurality of touch cells in a mutual capacitance scanning manner, in which the panel is provided with a normal mode and a waterproof mode, comprising: a) determining whether a maximum value of the detection values from the plurality of touch cells is greater than an upper threshold, and a minimum value of the detection values from the plurality of touch cells is less than a lower threshold; b) determining whether the maximum value minus the minimum value is greater than a first predetermined value; c) determining whether amount of the touch cells having detection values greater than the upper threshold is greater than an upper waterproof cell number, and amount of the touch cells having detection values less than the lower threshold is greater than a lower waterproof cell number; d) determining whether a sum of absolute values of the detection values less than the lower threshold is greater than a second predetermined value, and e) selecting the waterproof mode when two or more of the above steps are affirmative, or else selecting the normal mode.

Preferably, according to the present invention, steps a) to d) are repeated at least once in a different external environment before step e) is performed.

According to the present invention, the operation method further comprises before step a) the steps of f) using an initial mutual capacitance value of each of the plurality of touch cells of the panel as a reference value; and g) subtracting the reference value from each of the detection values of the plurality of touch cells.

According to the present invention, when a touch cell has a detection value smaller than 0 if any of other touch cells in the vertical direction and the horizontal direction of the touch cell has a detection value greater than an effective touch standard value, a calculated value according to the detection value of the touch cell and an absolute value of the touch cell is obtained as the detection value of the touch cell.

According to the present invention, when at least a touch event is detected, the upper threshold, the lower threshold, the first predetermined value, the upper waterproof cell number, the lower waterproof cell number, the second predetermined value, or the repetition is increased with number of the touch events.

According to the present invention, the waterproof mode is changed to the normal mode when steps a) to d) are no more affirmative in the same condition, or after the upper threshold, the lower threshold, the first predetermined value, the upper waterproof cell number, the lower waterproof cell number, or the second predetermined value is reduced to form a buffering effect.

The present invention also discloses a multi-mode operation method for a capacitive touch panel having a plurality of touch cells for obtaining a detection value from each of the plurality of touch cells in a mutual capacitance scanning manner, in which the panel is provided with a normal mode and a waterproof mode, wherein for an region of the panel which is not recognized to be touched in the waterproof mode, a change in the detection value is deemed to be caused by water, a waterproof reference value is thus established, and after the detection value of each of the plurality of touch cells is subtracted by the waterproof reference value, whether the panel is touched or not is determined.

According to the present invention, in the waterproof mode, an effective touch standard value for the waterproof mode is set to be greater than an effective touch standard value for the normal mode, and four adjacent touch cells to a touch cell having detection value greater than the effective touch standard value for the waterproof mode are provided with a surrounding condition to determine whether the touch cell is effectively touched.

According to the present invention, when there is no touch event in the waterproof mode, the effective touch standard value for the waterproof mode can be increased or a standard for the surrounding condition can be raised, and after the touch event occurs, the effective touch standard value for the waterproof mode is reset or the standard for the surrounding condition is reset.

According to the present invention, in the waterproof mode, when amount of the detection values of the plurality of touch cells greater than an upper threshold is greater than cell number with positive values or when amount of the detection values of the plurality of touch cells less than a lower threshold is greater than cell number with negative values, the effective touch standard value for the waterproof mode can be increased or a standard for the surrounding condition can be raised.

According to the present invention, in the waterproof mode, when it is determined that there is a touch event, a protection range is set around a touch coordinate to increase report standard in the protection range or any new touch event is prohibited.

According to the present invention, in the waterproof mode, the effective touch standard value of touch cells along sides of the touch panel is set to be less than the effective touch standard value for the waterproof mode, or the effective touch standard value of the touch cells at corners of the touch panel is set to be greater than the effective touch standard value for the waterproof mode, and then whether a touch cell having a detection value greater than the effective touch standard value for the waterproof mode is determined to be effectively touched or not is based on detection values of four adjacent touch cells, or the detection value of each of the plurality of touch cells is filtered or stabilized to improve stability of the touch effect.

According to the present invention, when a touch event representing that the touch panel is touched by a touch object is detected in the waterproof mode, after the touch object leaves the touch panel for a predetermined period of time, the touch panel will remain in the waterproof mode, or when amount of the touch cells having differential values between current detection values and previous detection values greater than a predetermined value is larger than a predetermined cell number, the touch panel will remain in the waterproof mode for another predetermined period of time without determining whether a next touch on the touch panel is effect or not.

Furthermore, the present invention discloses a multi-mode operation method for a capacitive touch panel having a plurality of touch cells for obtaining a detection value from each of the plurality of touch cells in a mutual capacitance scanning manner, in which the panel is provided with a normal mode and a water operation mode, and the water operation mode is selected by a water switch or in accordance with the conditions of: the detection values of the plurality of touch cells being increased by more than an effective touch standard value in a short period of time, and the detection values being stable within a predetermined time period; wherein a water reference value is established after the water operation mode is selected, absolute values or negative absolute values for the detection values of the plurality of touch cells are obtained, and then whether the panel is touched is determined.

According to the present invention, the panel is further provided with a waterproof mode, and the waterproof mode can be switched to the water mode by the water switch or based on the conditions.

According to the present invention, when the panel is in the water mode, the detection values of the plurality of touch cells can be increased or criteria for determining whether the panel is touched are changed, such that an effective touch standard value for the water mode is set to be smaller than an effective touch standard value for the normal mode, or four adjacent touch cells to a touch cell having detection value greater than the effective touch standard value for the water mode are provided with lower detection values so that chance of determining whether the panel is touched is increased.

According to the present invention, the panel is switched from the water mode to the waterproof mode or the normal mode when a sum of change amounts of the detection values of the plurality of touch cells in a short period of time is more than a water determination value, and a sum of change amounts of the detection values of the plurality of touch cells in a predetermined period of time is less than a stable predetermined value.

Moreover, the present invention further discloses a calculation apparatus comprising: a central processing unit (CPU); a touch panel for displaying and allowing a user to touch; and a controller, in communication with the touch panel and the CPU, for determining a touch effect based on touch detection values; wherein the CPU and the controller collaboratively operate to perform the method according to claim 1, 9 or 15.

According to the present invention, negative touch effect and contaminant adhesion can be identified, an effective touch can be accurately recognized when a touch panel is exposed to a large amount of water, and a case that liquid with high conductivity adhered to a touch panel and another case that a touch panel is touched by a glove can be distinguished. In comparison with the prior arts, therefore, the present invention has a relatively high effective touch recognition capability.

BRIEF DESCRIPTION OF THE DRAWINGS

The above and other objects, features and advantages of the present invention will be more apparent from the following detailed description taken in conjunction with the accompanying drawings, in which:

FIG. 2A and FIG. 2B show detection values of touch cells when the panel is touched by a finger without water and detection values of the touch cells with water on the touch panel, respectively;

FIG. 5 is a diagram showing a plurality of cell detection values of the touch panel to illustrate the negative touch effect;

DETAILED DESCRIPTION OF THE PREFERRED EMBODIMENTS

The present invention will now be described more specifically with reference to the following embodiments.

Figure 1:
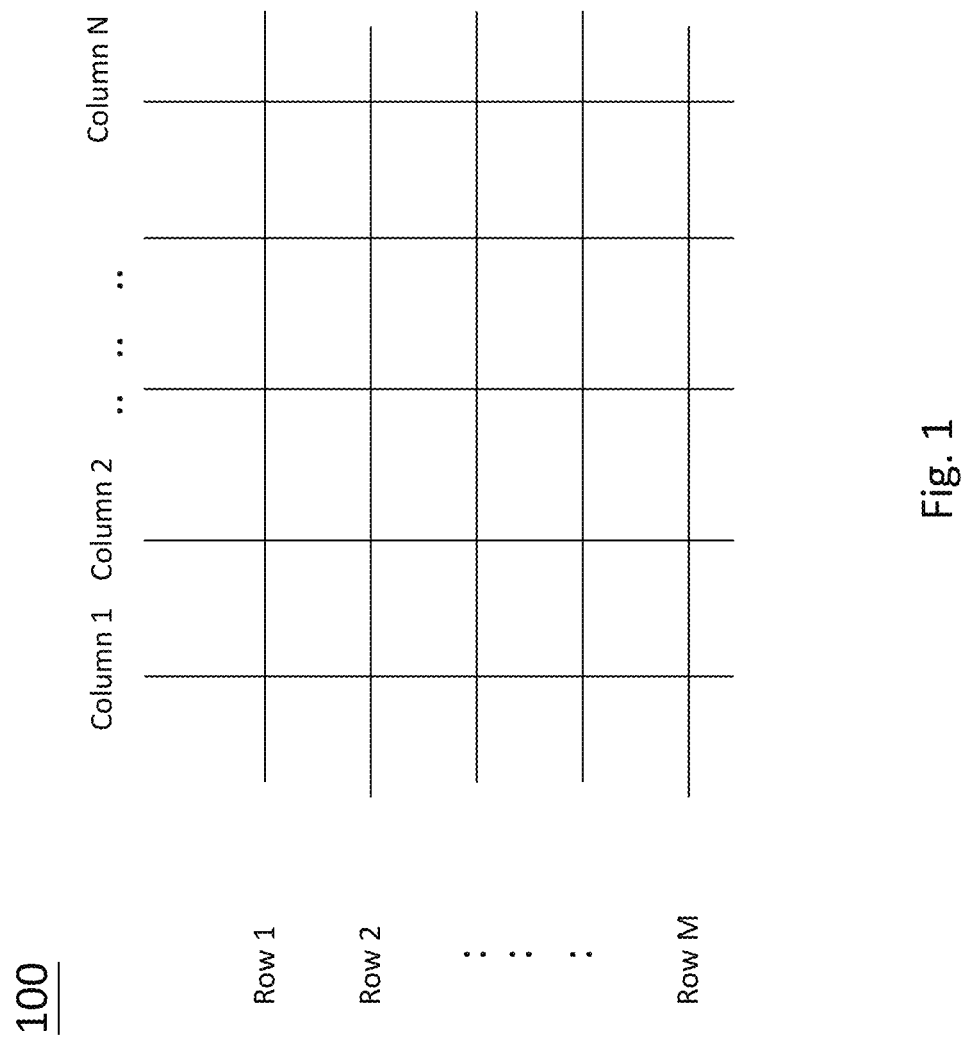
FIG. 1 is a view showing a mutual capacitive touch panel.

To facilitate understanding of the spirit and principles of the present invention, the arrangement and detection manner of the capacitive touch panel will be briefly described. Referring to FIG. 1, a touch panel 100 is provided with scan lines of N rows and M columns. Hereinafter, an area surrounded by two adjacent rows and two adjacent columns is referred to as a cell, and the entire touch panel is referred to as a frame. In general, a capacitive touch panel generates an induced electric field on a surface of the panel to obtain an equivalent capacitance value. When the panel is touched by a finger, the intensity of the induced electric field changes and the equivalent capacitance value also changes. Generally, the magnitude of the change is in the order of pF ($10^{-12}$ Farad), a signal thus obtained is converted into a digital signal by a device such as an analog-to-digital converter, and subjected to other processing to generate a corresponding value for performing different processes or operations. In general, there are two main scanning modes for scanning a touch panel to obtain the detection value. One is self-capacitance scanning and the other is mutual capacitance scanning. The present invention mainly uses mutual capacitance scanning to obtain detection values.

Herein, the capacitive detection values of the capacitive touch cells are changed along with different environmental conditions such as foreign object touch or adhesion. The initial data obtained without being touched or contacted by foreign objects is referred to as a reference value. An initial value is obtained when the capacitive touch panel is touched by a finger. The initial value minus the reference value is equal to a differential value, which stands for a change amount generated by the finger touch; that is, the differential value=the initial value−the reference value. For example, FIG. 2A shows change amounts of the touch cells touched by a finger in a normal condition. Namely, all the values shown in the drawing are differential values. As shown in FIG. 2A, the cell with value of 1197 and its surrounding cells have values significantly larger than those of other touch cells and are therefore considered to be touched by a finger. Hereafter, the change amount is called detection value.

In general, the touch panel has two operation modes: normal mode and waterproof mode. The waterproof mode refers to an operation mode when water is present on the touch panel; otherwise, it is the normal mode.

Figure 3:
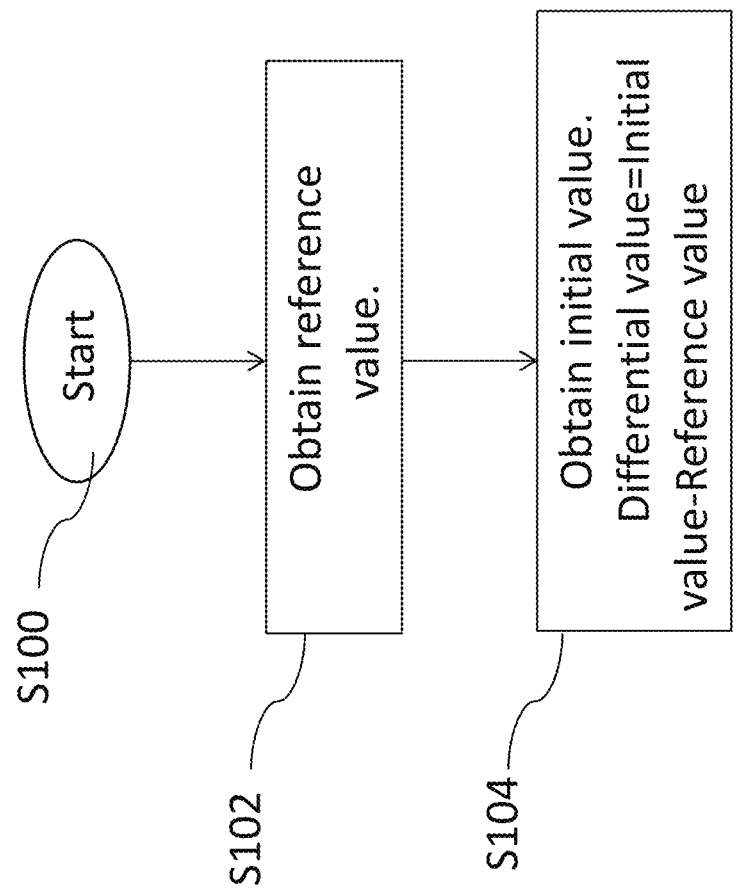
FIG. 3 is a flowchart illustrating mutual capacitance signal processing according to an embodiment of the present invention.

FIG. 3 is a flowchart illustrating mutual capacitance signal processing according to an embodiment of the present invention. As shown in FIG. 3, in step S100, the entire touch panel is scanned in a mutual capacitive manner to obtain mutual capacitance value signals, and A/D processing is performed on the signals to obtain corresponding values as reference values. For example, in a clean environment without foreign objects, the reference values of the touch cells would be within a certain range, such as ±30. Then, the flow proceeds to step S102.

In step S102, the entire touch panel is scanned in a mutual capacitive manner to obtain mutual capacitance value signals, and the signals are subjected to A/D processing or the like to obtain corresponding values as initial values. Then, in step S104, the reference values are subtracted from the initial values to obtain differential values (=initial values−reference values) as the current detection values for subsequent processing. In general, the panel enters the normal operation mode after initial booting. For example, in the case where the entire touch surface has 28×16 cells, an effective touch standard value (or simply referred to as standard value) is preset to 400. Namely, when a value of a cell is greater than or equal to 400, it is regarded as being effectively touched. If the touch panel is in the normal mode, the maximum detection value caused by finger touch is 1200.

Figure 4:
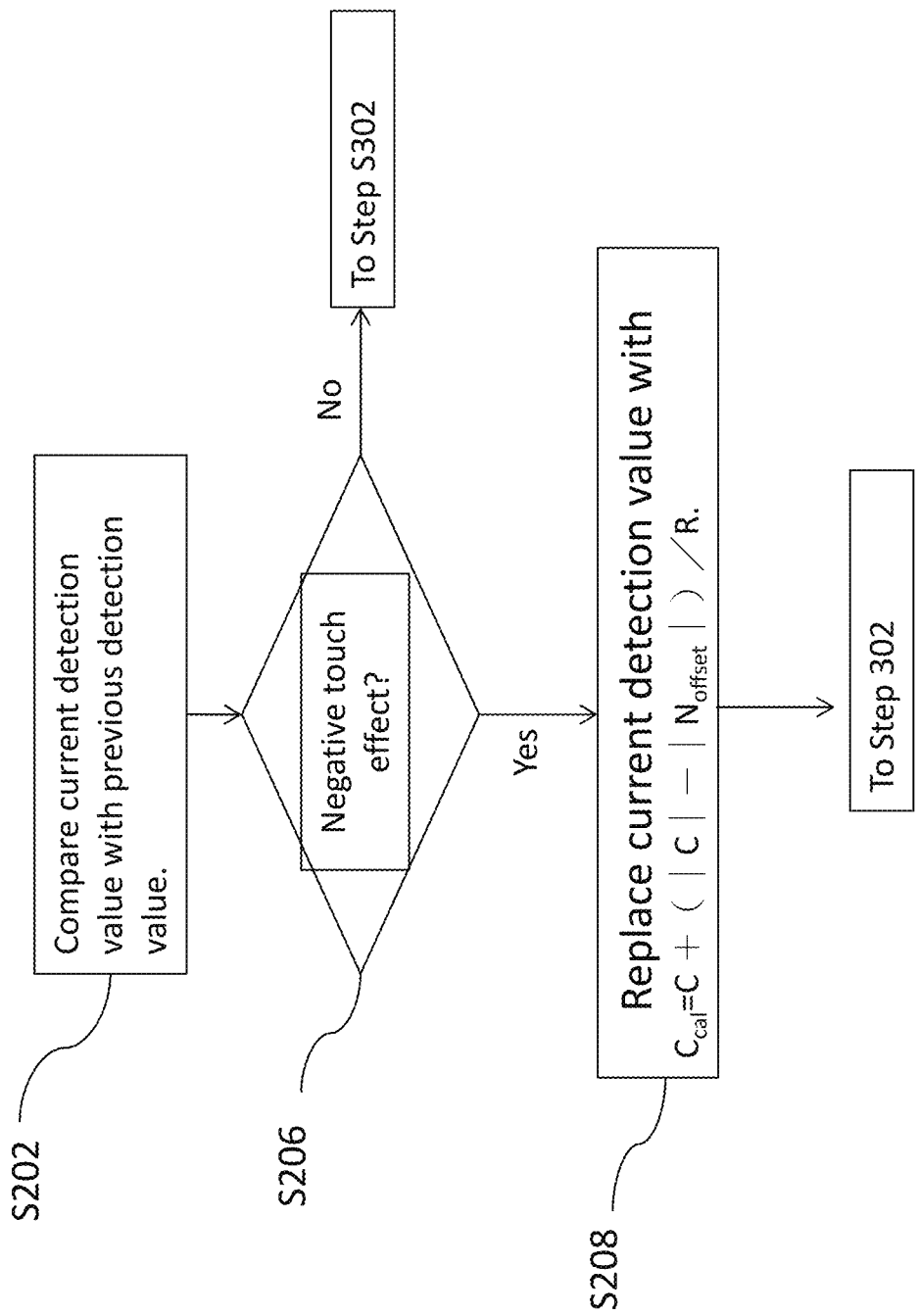
FIG. 4 is a flowchart illustrating tracking and negative touch effect according to the embodiment of the present invention.

According to an embodiment of the present invention, the detection values obtained as above are subjected to tracking and negative touch effect processing for mode determination and mode processing. As shown in FIG. 4, in step S202, a tracking process is performed to compare a current detection value of each touch cell with a previous detection value, and the comparison result may provide touch point information on the touch panel and the like. For example, according to the comparison result, it can be known whether a new touch event occurs, and a movement trace of a touch object such as a finger is known.

Figure 5:
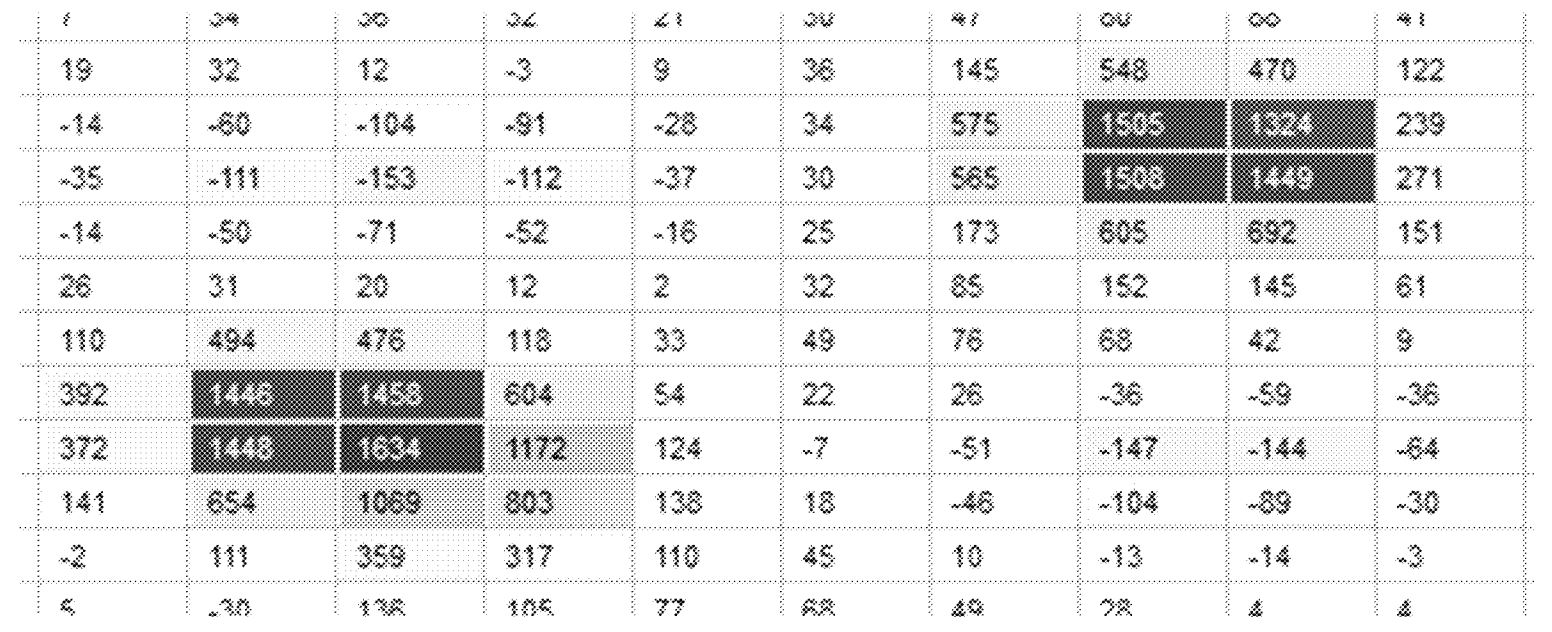

Negative touch effect means that when two or more fingers touch the touch surface and cause more than two touch points, a negative detection value is generated between these effective touch points. This effect is called negative touch effect. When a touch event occurs and values of some cells are negative according to the comparison result of the tracking process, the negative touch effect processing is performed. For example, as shown in FIG. 5, there are two touch points (cells highlighted), and values of multiple cells in the frame are negative due to the negative effect. However, some cells may have negative values due to the influence of contaminants. Therefore, in order to avoid the negative touch effect being identified as a contaminant, a negative touch effect processing is performed on cells having negative values. In step S206, it is determined whether or not a cell is affected by the negative touch effect. If a cell has a detection value less than an effective touch standard value, and cells in the vertical and horizontal directions of this touch cell have detection values larger than the standard value, then this touch cell is considered to be affected by the negative touch effect. For example, the cell with a value of −153 in FIG. 5 conforms to the negative touch effect. If the determination result is yes, then the flow proceeds to step S208.

In step S208, the current value of the touch cell is replaced by $C_{cal}$ according to following equation:

$$C_{cal}=C+(|C|-|N_{offset}|)/R$$

where $C_{cal}$: calculation value for negative touch effect, C: cell value, $N_{offset}$: negative touch effect offset, and R: ratio.

Therefore, a cell value of −153 will become −132 (−153+(|−153|−|90|)/2≈−132). Thus, before waterproof mode determination, the cells affected by the negative touch effect won't be determined incorrectly as contaminated points, thereby further increasing the determination accuracy.

According to the embodiment of the present invention, the detection values obtained above are provided for mode determination processing and/or for various mode processing.

Next, mode determination and related mode processing according to the embodiment of the present invention will be described. First, the "waterproof mode" determination and processing operation according to the embodiment of the present invention will be described. The waterproof mode refers to the case when water is present on the touch panel.

Figure 6:
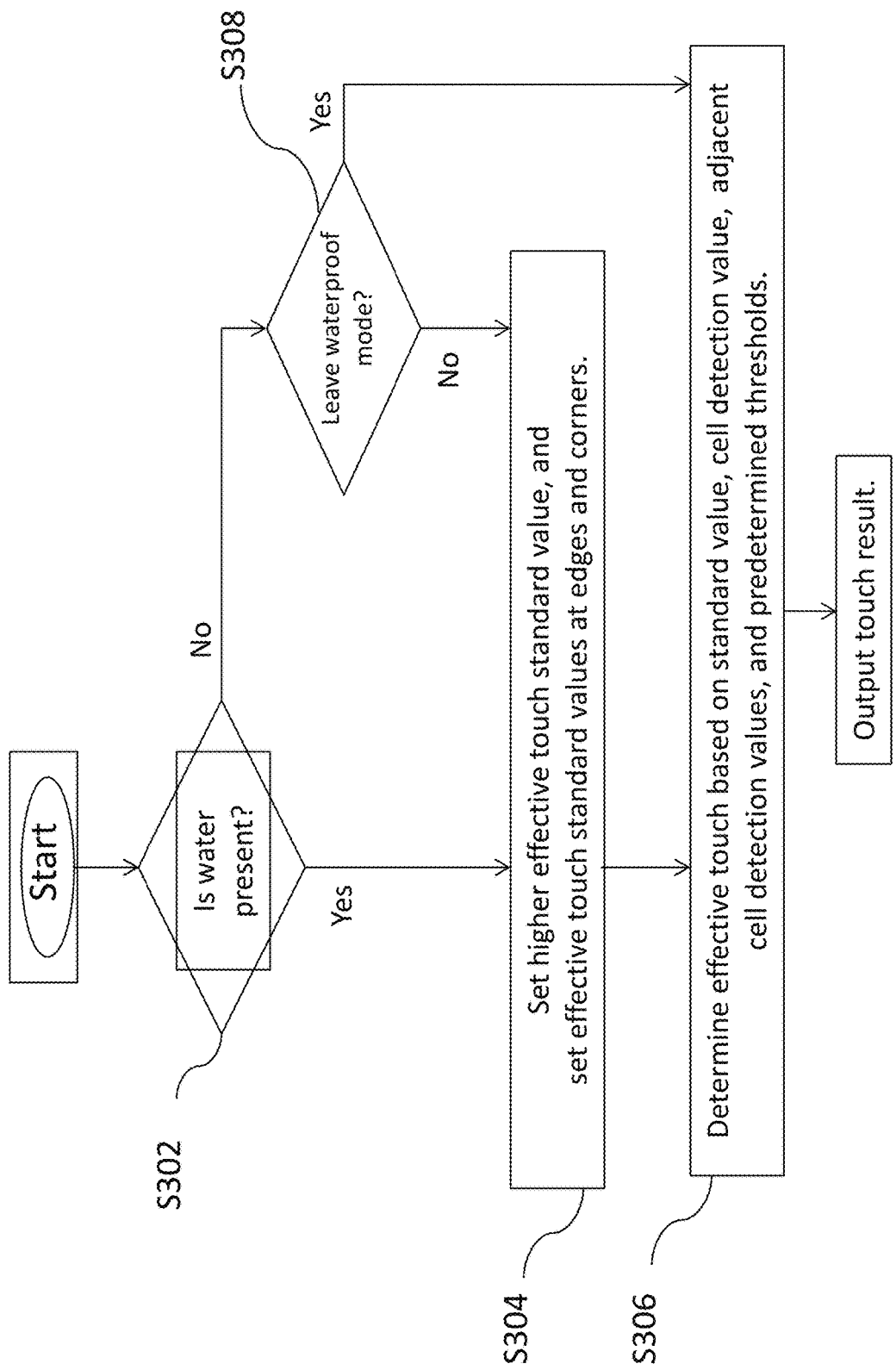
FIG. 6 is a flowchart showing waterproof mode determination and procedures thereof.

FIG. 6 is a flowchart showing waterproof mode determination and processing operation thereof. In step S302, according to the touch panel detection values obtained after the tracking and negative touch effect processing, it is first determined whether there is water on the touch panel, in order to determine whether to maintain the normal mode or enter the waterproof mode or switch from the waterproof mode to the normal mode. If it is determined that there is water on the touch panel, it will enter the waterproof mode; otherwise, it will remain in the normal mode or switch from the waterproof mode to the normal mode. For example, if the following five conditions are met, it is determined that there is water present and the panel enters the waterproof mode. 1. A maximum detection value of the touch cells is greater than an upper waterproof threshold, for example, 200, or a minimum value is less than a lower waterproof threshold, for example, −200. 2. The maximum cell detection value minus the minimum cell detection value is greater than a predetermined value, for example, 300. 3. Amount of cells having detection values greater than the upper waterproof threshold (e.g., 200) is greater than an upper waterproof cell number (e.g., >4 cells), and amount of cells having detection values less than the lower threshold (e.g., −180) is greater than a lower waterproof cell number (e.g., >8 cells). 4. A sum of absolute values for detection values less than the lower threshold (e.g., −180) minus waterproof offset values (e.g., 200) is greater than a predetermined value (e.g., >420). For example, the sum of the four cell values within bold lines in FIG. 2B is (|−259|+|−370|+|−226|)>420. 5. All the cells are scanned at least twice in order to meet conditions 1 to 4. It should be noted that, preferably, each of the above thresholds, offset values, or predetermined values may depend on the size of the touch panel, the cell number, and the like. If the above five conditions are met, which means water present on the touch panel, then the flow proceeds to step S304 to enter the waterproof mode operation.

In step S304, a higher effective touch standard value than the normal mode is set. For example, the effective touch standard value is set to 400 in the normal mode, while the effective touch standard value is set to 600 in the waterproof mode. In addition, according to the embodiment of the present invention, in order to accurately determine the water contents at edges and corners of the touch panel to reduce wrong determination, the effective touch standard values at the edges and corner of the touch panel are different from that in the remaining region. For example, when the effective touch standard value in the remaining region is set to 600, the effective touch standard value at the edges of the touch panel is reduced, for example, to 550, and the effective touch standard value at the corners is increased, for example, to 700. Thus, it is possible to avoid wrong determination of effective touch points. Then, the flow proceeds to step S306.

In step S306, it is determined whether a touch cell is effectively touched on the basis of comparisons of detection values of the touched cell and its adjacent cells with the effective touch standard and the predetermined thresholds. For example, it is determined whether the detection value of the touch cell is greater than an effective touch standard value (e.g., 600) and whether it is greater than or equal to the detection values of all surrounding adjacent cells. Here, the surrounding adjacent cells refer to the adjacent cells to the touch cell in the vertical and horizontal directions. For example, a top or bottom cell has only three adjacent cells, and a central cell has four adjacent cells. Next, it is determined whether the values of the adjacent cells to the touch cell are greater than 0, whether the sum of the values of the upper and lower adjacent cells is greater than a first predetermined threshold (e.g., 600), and whether the sum of the values of the left and right adjacent cells is greater than a second predetermined threshold (e.g., 600), or whether the sum of the values of the four adjacent cells is greater than a third predetermined threshold (e.g., 900). If yes, then the touch cell will be determined to be effectively touched, and thus the touch result will be outputted. For example, as shown in FIG. 2B, a cell has a detection value of 603 greater than the effective touch standard value, but the value of the right adjacent cell is −193, which does not meet the condition that all the adjacent values need to be greater than 0. Therefore, it is not deemed as an effective touch. It should be understood that the above-mentioned standard values or related thresholds are merely illustrative, and they may differ depending on conditions such as spacing of columns and rows. For example, the relevant thresholds may be determined based on a large amount of measurement data.

In addition, when it is determined that effective touch point exist, if a distance between two touch points is within 6 cells, only the touch point with a larger detection value is valid while the other point is ignored. Moreover, in order to prevent the touch panel from switching from the waterproof mode to the normal mode due to a wrong determination in step 302 because water on the touch panel is moved by a touch object when the touch object touches the touch panel, the following condition needs to be considered. If it is determined in step S302 that there is no water and the panel is ready to be switched from the waterproof mode to the normal mode, whether to leave the waterproof mode or not should be determined (S308). When the panel is in the waterproof mode before step S302, it is determined that the touch object causes the touch event. After that, if the touch object leaves the touch panel for a predetermined period of time, the panel will be forced to remain in the waterproof mode. Alternatively, if amount of touch cells having differences between current detection values and the previous detection values greater than a predetermined value is greater than a predetermined cell number, the panel will remain in the waterproof mode for a predetermined period time and no effective touch determination is performed. In other words, if the determination of step S302 is that there is no water, the following two conditions should be considered. Firstly, it is determined whether the panel is in the waterproof mode before the flow proceeds to step S302. Secondly, it is determined whether amount of touch cells having differences between current detection values and the previous detection values greater than a predetermined value is greater than a predetermined cell number. When any one of the above two conditions is satisfied, even if it is determined in step S302 that there is no water on the panel, the waterproof mode is maintained for a predetermined period of time without directly switching to the normal mode, and then step S304 is performed. Otherwise, the panel is switched from the waterproof mode to the normal mode, and then the flow proceeds to step S306.

In step S308, it is determined whether to leave the waterproof mode or not. The determination conditions in this step are more severe than the conditions for determining the entry into the waterproof mode, in order to avoid frequent switching between two different modes in the case of boundary conditions. For example, suppose that a value of a touch cell is 0 when the touch cell is completely water-free and 100 when the cell does not function due to too much water. A threshold for entering the waterproof mode is set to 80, and a threshold for leaving the waterproof mode is set to 60. When the panel is in the waterproof mode and the value is between 60 and 80, it is maintained in the waterproof mode.

In addition, when it is determined that a finger moves from the panel, the panel will remain in the waterproof mode for at least a certain period of time, such as, 0.5 second, and the effective touch point recognition process is still performed. Alternatively, when amount of cells having differences between current detection values and previous detection values greater than a predetermined change value is greater than a predetermined cell number corresponding to thumb width, for example, 2 cells, the panel would remain in the waterproof mode for at least a period of time, for example, 0.5 seconds, but no effective touch point recognition process will be performed.

When it is determined in step S308 that the panel leaves the waterproof mode, it will return to the normal mode. Otherwise, the flow returns to step S306.

In this embodiment, for determining whether to leave the waterproof mode and returning to the normal mode in step S308, there are five conditions as follows. 1. A maximum detection value of the touch cells is greater than an upper waterproof threshold, for example, 150, or a minimum value is less than a lower waterproof threshold, for example, −150. 2. The maximum cell detection value minus the minimum cell detection value is greater than a predetermined value, for example, 210. 3. Amount of cells having detection values greater than the upper waterproof threshold (e.g., 150) is greater than an upper waterproof cell number (e.g., >3 cells), and amount of cells having detection values less than the lower threshold (e.g., −150) is greater than a lower waterproof cell number (e.g., >6 cells). 4. A sum of absolute values for detection values less than the lower threshold (e.g., −150) minus waterproof offset values (e.g., 150) is greater than a predetermined value (e.g., >420). For example, the sum of the four cell values within bold lines in FIG. 2B is (|−259|+|−370|+|−226|)>420. 5. All the cells are scanned at least twice in order to meet conditions 1 to 4. It should be noted that, preferably, each of the above thresholds, offset values, or predetermined values may depend on the size of the touch panel, the cell number, and the like. If the above five conditions are met, the panel would leave the waterproof mode to return to the normal mode.

As described above, the operation modes of the touch panel mainly include the normal mode and the waterproof mode. The waterproof mode refers to an operation mode when water is present on the touch panel, and the operation mode other than the water mode is the normal mode. According to the present invention, as long as a small amount of water is present on the touch panel, the waterproof mode is activated. Even if the entire panel is immersed in water, it is considered that water is present on the touch panel. However, these two situations are different. More specifically, when only a small amount of water is present on the touch panel, it can be determined whether it is water residual or a touch cell is effectively touched based on comparisons of detection values of adjacent cells with the effective touch standard and multiple predetermined thresholds. However, when the panel is immersed in water, all of the touch cells on the panel will be wetted, so that all detection values will increase. In this case, if the panel is touched by a finger, change amount of the detection value will be relatively small, making touch determination difficult. Therefore, the present invention is further provided with a water mode for the state in which the entire panel is immersed in water. In comparison with the case that when a small amount of water is present on the touch panel, detection values of touch cells touched by water residual or a finger will increase significantly due to pressure, when the panel is immersed in water, detection value of a touch cell touched by a finger will decrease. It is because all of the touch cells on the panel are wet and water on the touch panel is moved away when the finger slides on the touch panel. Therefore, effective touch can be determined.

The water operation mode is selected by a water switch or in accordance with the following conditions. The detection values of the touch cells are increased by more than an effective touch standard value in a short period of time, and the detection values are stable within a predetermined time period (e.g., 0.5 seconds). A water reference value is established after the water mode is activated. Absolute values or negative absolute values for the detection values of the touch cells are obtained, and then whether the panel is touched is determined.

Since all the touch cells on the panel are immersed in the water, the detection values will be enhanced. Therefore, when the panel is in the water mode, in order to effectively determine a finger touch, the detection values of the touch cells can be increased or criteria for determining whether the panel is touched are changed. For example, an effective touch standard value for the water mode is set to be smaller than an effective touch standard value for the normal mode. Alternatively, four adjacent touch cells to a touch cell having detection value greater than the effective touch standard value for the water mode are provided with lower detection values, so as to correctly determine whether the touch cell is touched.

The panel is switched from the water mode to the waterproof mode or the normal mode when a sum of change amounts of the detection values of the touch cells in a short period of time is more than a water determination value, and a sum of change amounts of the detection values of the touch cells in a predetermined period of time is less than a stable predetermined value.

Compared with the prior arts, according to the present invention, wrong determinations can be significantly reduced, and accuracy of effective touches can be greatly increased. The known waterproof mode does not function when there is a considerable amount of water, while the waterproof mode according to the present invention can correctly determinate effective touches.

Figure 7:
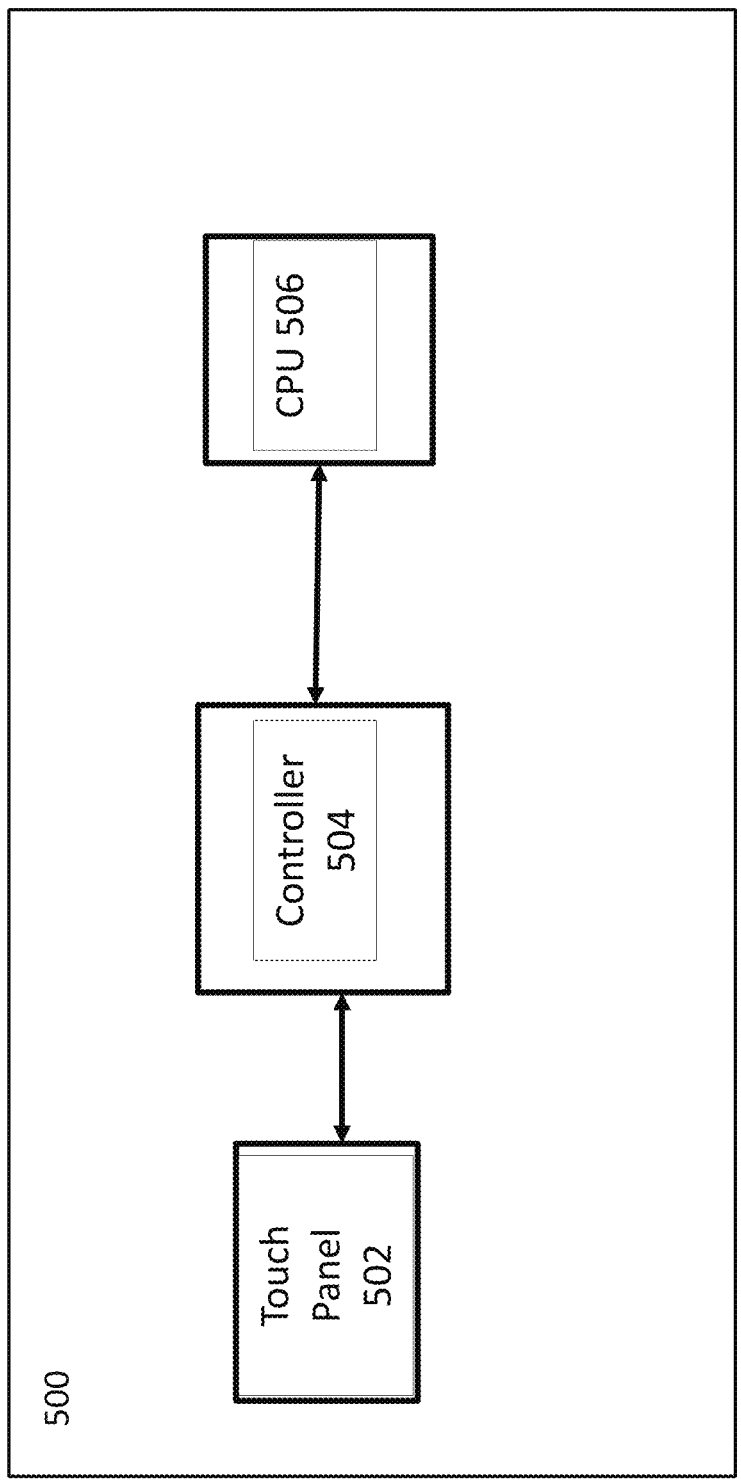
FIG. 7 is a block diagram showing a calculation apparatus according to an embodiment of the present invention.

FIG. 7 is a block diagram showing a calculation apparatus 500 in accordance with an embodiment of the present invention. As shown, the calculation apparatus 500 includes a touch panel 502, a controller 504, and a central processing unit 506. The touch panel 502 is used for displaying and allowing a user to operate by means of finger touch. The controller 506 can obtain an input signal from the touch panel and cooperate with the central processing unit 508 to perform at least one of the above-mentioned modes of the present invention according to the input signal. The calculation apparatus 500 is capable of performing waterproof mode processing of the present invention with high touch point accuracy.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims, which are to be accorded with the broadest interpretation so as to encompass all such modifications and similar structures.

What is claimed is:

1. A multi-mode operation method for a capacitive touch panel having a plurality of touch cells for obtaining a detection value from each of the plurality of touch cells in a mutual capacitance scanning manner, in which the panel is provided with a normal mode and a waterproof mode, comprising:
   a) determining whether a maximum value of the detection values from the plurality of touch cells is greater than an upper threshold, and a minimum value of the detection values from the plurality of touch cells is less than a lower threshold;
   b) determining whether the maximum value minus the minimum value is greater than a first predetermined value;
   c) determining whether amount of the touch cells having detection values greater than the upper threshold is greater than an upper waterproof cell number, and amount of the touch cells having detection values less than the lower threshold is greater than a lower waterproof cell number;
   d) determining whether a sum of absolute values of the detection values less than the lower threshold is greater than a second predetermined value, and
   e) selecting the waterproof mode when two or more of the above steps are affirmative, or else selecting the normal mode.

2. The method according to claim 1, wherein steps a) to d) are repeated at least once in a different external environment before step e) is performed.

3. The method according to claim 2, wherein when at least a touch event is detected, the upper threshold, the lower threshold, the first predetermined value, the upper waterproof cell number, the lower waterproof cell number, the second predetermined value, or the repetition is increased with number of the touch events.

4. The method according to claim 1, further comprising before step a) the steps of
 f) using an initial mutual capacitance value of each of the plurality of touch cells of the panel as a reference value; and
 g) subtracting the reference value from each of the detection values of the plurality of touch cells.

5. The method according to claim 1, wherein when a touch cell has a detection value smaller than 0 if any of other touch cells in the vertical direction and the horizontal direction of the touch cell has a detection value greater than an effective touch standard value, a calculated value according to the detection value of the touch cell and an absolute value of the touch cell is obtained as the detection value of the touch cell.

6. The method according to claim 1, wherein when at least a touch event is detected, the upper threshold, the lower threshold, the first predetermined value, the upper waterproof cell number, the lower waterproof cell number, or the second predetermined value is increased with number of the touch events.

7. The method according to claim 1, wherein the waterproof mode is changed to the normal mode when steps a) to d) are no more affirmative in the same condition, or after the upper threshold, the lower threshold, the first predetermined value, the upper waterproof cell number, the lower waterproof cell number, or the second predetermined value is reduced to form a buffering effect.

8. The method according to claim 1, wherein when a touch event representing that the touch panel is touched by a touch object is detected in the waterproof mode, after the touch object leaves the touch panel for a predetermined period of time, the touch panel will remain in the waterproof mode, or when amount of the touch cells having differential values between current detection values and previous detection values greater than a predetermined value is larger than a predetermined cell number, the touch panel will remain in the waterproof mode for another predetermined period of time without determining whether a next touch on the touch panel is effect or not.

9. A calculation apparatus, comprising:
 a central processing unit (CPU);
 a touch panel for displaying and allowing a user to touch; and
 a controller, in communication with the touch panel and the CPU, for determining a touch effect based on touch detection values;
 wherein the CPU and the controller collaboratively operate to perform the method according to claim 1.

10. A multi-mode operation method for a capacitive touch panel having a plurality of touch cells for obtaining a detection value from each of the plurality of touch cells in a mutual capacitance scanning manner, in which the panel is provided with a normal mode and a waterproof mode, wherein for an region of the panel which is not recognized to be touched in the waterproof mode, a change in the detection value is deemed to be caused by water, a waterproof reference value is thus established, and after the detection value of each of the plurality of touch cells is subtracted by the waterproof reference value, whether the panel is touched or not is determined, wherein in the waterproof mode, an effective touch standard value for the waterproof mode is set to be greater than an effective touch standard value for the normal mode, and four adjacent touch cells to a touch cell having detection value greater than the effective touch standard value for the waterproof mode are provided with a surrounding condition to determine whether the touch cell is effectively touched.

11. The method according to claim 10, wherein when there is no touch event in the waterproof mode, the effective touch standard value for the waterproof mode can be increased or a standard for the surrounding condition can be raised, and after the touch event occurs, the effective touch standard value for the waterproof mode is reset or the standard for the surrounding condition is reset.

12. The method according to claim 10, wherein in the waterproof mode, when amount of the detection values of the plurality of touch cells greater than an upper threshold is greater than cell number with positive values or when amount of the detection values of the plurality of touch cells less than a lower threshold is greater than cell number with negative values, the effective touch standard value for the waterproof mode can be increased or a standard for the surrounding condition can be raised.

13. The method according to claim 10, wherein in the waterproof mode, when it is determined that there is a touch event, a protection range is set around a touch coordinate to increase report standard in the protection range or any new touch event is prohibited.

14. The method according to claim 10, wherein in the waterproof mode, the effective touch standard value of touch cells along sides of the touch panel is set to be less than the effective touch standard value for the waterproof mode, or the effective touch standard value of the touch cells at corners of the touch panel is set to be greater than the effective touch standard value for the waterproof mode, and then whether a touch cell having a detection value greater than the effective touch standard value for the waterproof mode is determined to be effectively touched or not is based on detection values of four adjacent touch cells, or the detection value of each of the plurality of touch cells is filtered or stabilized to improve stability of the touch effect.

15. A calculation apparatus, comprising:
 a central processing unit (CPU);
 a touch panel for displaying and allowing a user to touch; and
 a controller, in communication with the touch panel and the CPU, for determining a touch effect based on touch detection values;
 wherein the CPU and the controller collaboratively operate to perform the method according to claim 10.

16. A multi-mode operation method for a capacitive touch panel having a plurality of touch cells for obtaining a detection value from each of the plurality of touch cells in a mutual capacitance scanning manner, in which the panel is provided with a normal mode and a water operation mode while the entire capacitive touch panel is immersed in water, wherein the water operation mode is selected by a water switch or in accordance with the conditions of:
 the detection values of the plurality of touch cells being increased by more than an effective touch standard value in a short period of time, and the detection values being stable within a predetermined time period;
 wherein a water reference value is established after the water operation mode is selected, absolute values or negative absolute values for the detection values of the plurality of touch cells are obtained, and then whether the panel is touched is determined and of which touch cells are touched are identified by determining of which touch cells have decreased detection values.

17. The method according to claim 16, wherein the panel is further provided with a waterproof mode, and the waterproof mode can be switched to the water mode by the water switch or based on the conditions.

18. The method according to claim 17, wherein when the panel is in the water mode, the detection values of the plurality of touch cells can be increased or criteria for determining whether the panel is touched are changed, such that an effective touch standard value for the water mode is set to be smaller than an effective touch standard value for the normal mode, or four adjacent touch cells to a touch cell having detection value greater than the effective touch standard value for the water mode are provided with lower detection values so that chance of determining whether the panel is touched is increased.

19. The method according to claim 17, wherein the panel is switched from the water mode to the waterproof mode or the normal mode when a sum of change amounts of the detection values of the plurality of touch cells in a short period of time is more than a water determination value, and a sum of change amounts of the detection values of the plurality of touch cells in a predetermined period of time is less than a stable predetermined value.

20. The method according to claim 16, wherein when the panel is in the water mode, the detection values of the plurality of touch cells can be increased or criteria for determining whether the panel is touched are changed, such that an effective touch standard value for the water mode is set to be smaller than an effective touch standard value for the normal mode, or four adjacent touch cells to a touch cell having detection value greater than the effective touch standard value for the water mode are provided with lower detection values so that chance of determining whether the panel is touched is increased.

21. The method according to claim 16, wherein the panel is switched from the water mode to the waterproof mode or the normal mode when a sum of change amounts of the detection values of the plurality of touch cells in a short period of time is more than a water determination value, and a sum of change amounts of the detection values of the plurality of touch cells in a predetermined period of time is less than a stable predetermined value.

22. A calculation apparatus, comprising:
   a central processing unit (CPU);
   a touch panel for displaying and allowing a user to touch; and
   a controller, in communication with the touch panel and the CPU, for determining a touch effect based on touch detection values;
   wherein the CPU and the controller collaboratively operate to perform the method according to claim 16.

* * * * *